United States Patent
Bornovolokov

(10) Patent No.: US 10,415,216 B2
(45) Date of Patent: Sep. 17, 2019

(54) TWO-VALVE MIXER WITH SEPARATE CONTROL OF WATER TEMPERATURE AND PRESSURE

(71) Applicant: Dmitry Leonidovich Bornovolokov, Moscow (RU)

(72) Inventor: Dmitry Leonidovich Bornovolokov, Moscow (RU)

(*) Notice: Subject to any disclaimer, the term of this patent is extended or adjusted under 35 U.S.C. 154(b) by 0 days.

(21) Appl. No.: 15/559,051

(22) PCT Filed: Mar. 9, 2016

(86) PCT No.: PCT/RU2016/000124
§ 371 (c)(1),
(2) Date: Sep. 17, 2017

(87) PCT Pub. No.: WO2016/153390
PCT Pub. Date: Sep. 29, 2016

(65) Prior Publication Data
US 2018/0073224 A1 Mar. 15, 2018

(30) Foreign Application Priority Data
Mar. 26, 2015 (RU) .................. 2015110837

(51) Int. Cl.
*E03C 1/04* (2006.01)
*F16K 3/08* (2006.01)
*F16K 11/074* (2006.01)
*F16K 11/00* (2006.01)

(52) U.S. Cl.
CPC .................. *E03C 1/04* (2013.01); *F16K 3/08* (2013.01); *F16K 11/074* (2013.01); *F16K 19/006* (2013.01)

(58) Field of Classification Search
CPC ............. E03C 1/04; F16K 3/08; F16K 11/074
USPC ...................................... 4/675, 676
See application file for complete search history.

(56) References Cited

U.S. PATENT DOCUMENTS

| | | | |
|---|---|---|---|
| 2009/0001178 A1* | 1/2009 | Jarvis ..................... | F16K 11/074 137/545 |
| 2010/0193039 A1* | 8/2010 | Illingworth ............... | E03C 1/04 137/112 |
| 2013/0019975 A1* | 1/2013 | Chen ..................... | E03C 1/0404 137/801 |

* cited by examiner

*Primary Examiner* — Tuan N Nguyen

(57) ABSTRACT

A mixer comprising an inlet valve head with a cold water pipe and a hot water pipe, the outlet opening of which head is connected by a channel to the inlet opening of an outlet valve head. Two inlet openings of an immovable disc of the inlet valve head are arranged symmetrically, each of which is at an angle of up to 180°, a movable disc has a passage opening analogous to the openings in the immovable disc, and the water flow temperature is controlled within a rotation range of up to 180°, and a shut-off member of the outlet valve head is in the form of an immovable disc and a movable disc, which have openings analogous to the opening in the movable disc of the inlet valve head, and the water pressure is adjusted within a rotation range of up to 180°.

1 Claim, 4 Drawing Sheets

TWO-VALVE MIXER WITH SEPARATE CONTROL OF WATER TEMPERATURE AND PRESSURE

The invention relates to the field of water-conducting equipment and can be used as a mixer of cold and hot water for domestic or industrial purposes.

In traditional two-valve mixers comprising a body, two cold and hot water shut-off valves, the outlets of which are connected to the mixer chamber and spout, the required flow temperature is selected each time the water is opened. The disadvantage of traditional two-valve mixers is that they do not give the opportunity to use the selected water temperature repeatedly. Selection of water temperature, firstly, takes a certain time, and secondly, water is wasted unproductively during this time. Thirdly, at small intervals between the productive expenditure, water, as a rule, does not stop, so as not to waste time on re-selecting the temperature. Such gaps account for between 15 and 40% of the total water consumption time. In addition, if necessary, to reduce the water pressure of the selected temperature, it is necessary to re-select its temperature, which is significantly complicated by a notable increase in the temperature adjustment step with decreasing water pressure.

The water supply mixer is known (Patent RU 2067713, published on Oct. 10, 1996), comprising an inlet valve head body with cold and hot water supply pipes and a shut-off device in the form of two discs contacting each other; one is stationary disc with two identical inlets and another is movable disc with a passage with the possibility of its sequential alignment with the inlets of the stationary disc, with an inlet valve head body outlet connected by a channel with the inlet of the switch body having a shut-off device that diverts water to one of the two outlets of the switch body, one of which is connected to a spout and the second to a supply pipe for connecting a flexible hose with a shower head, notable for two inlets of the stationary disc of the inlet valve head are located at 90° angle, and the switch shut-off device is made in the form of a stationary circular washer with two identical and diametrically located openings and a movable circular washer with a hole, that is similar to the openings of a stationary washer and is located with the possibility of coincidence with one of them in one of the extreme positions; these washers are contacting each other.

The shower mixer with a cold and hot water pressure equalizer is known (U.S. Pat. No. 4,095,610, published on Jun. 20, 1978) including an inlet valve assembly with cold and hot water supply pipes, the outlet of which is connected by a channel to the switch inlet directing water in spout or into the supply pipe for connecting a flexible hose with a shower head and performing the function of adjusting the water pressure. The water temperature in said shower mixer is adjusted preferably within a 90° rotation range. Further movement of the handle, rod and movable disc of the inlet valve head to 135° results in shutting the cold-water flow off. Adjustment of the water pressure by means of the switch handle is also carried out within the limits of the turn by 90°. The drawbacks of this mixer in comparison with the first mentioned are the design complexity and insufficiently high adjusting characteristics.

There is also a water supply mixer (Patent RU 2228475, published on May 10, 2004), generally similar to the first, but differing in that inlet and outlet assemblies connected by a channel are equipped with valve heads with rotatable handles, rods with plugs, freely contacting with movable discs, wherein the movable disc of the inlet assembly has two identical openings, similar to those of the stationary disc and located at an angle of 120°.

Although the movable disc of the inlet assembly of this mixer has two identical openings, similar to the openings of the stationary disc and located at an angle of 120°, the adjustment of the water flow temperature is carried out within the rotation range of the handle, rod and movable disc by 60°, while in its prototype—within 90° rotation range. In general, this mixer has lower adjusting characteristics compared to the first water supply mixer.

The closest prototype of the invention is the first of the three mentioned mixers. The first drawback of the closest prototype is that it adjusts the water temperature within a 90° rotation range. As a result, the mixer has a too large step of adjusting the water temperature, which leads to inaccurate selection of this important parameter for any mixer. Inaccurate selection, in turn, contributes to an increase in the time of water temperature selection and can lead to a choice of higher water temperatures than necessary for the consumer.

The second drawback of this mixer is that the water pressure adjustment is also carried out within the 90° rotation range. As a result, the mixer not only has too large step of adjusting the water pressure which leads to inaccurate selection of this parameter and the choice of more than necessary water pressure, but creates, when the water is shut-off and opened, sufficiently strong water hammers, which result in a breach of leaktightness of both the outlet and inlet valves and shortening of their service life.

As a third drawback, the distinction between the mixing and shut-off functions between the valves is not clearly delineated. In a conventional mixer design, the first valve acts both the function of mixing the cold and hot water flows and the shut-off function, and the second valve—the function of shutting-off the mixed flow and the function of switching the supply of mixed water to the spout or to the supply pipe for the shower hose. The water flow shut-off by means of the inlet valve head handle leads to the need to re-select the water temperature. In addition, to open the water with the inlet valve head handle, one must first open the cold water, and then select the desired temperature of the mixed water. In this case, the spout is initially filled with cold water, which distorts the perception of the temperature of the selected ratio of cold and hot water. Only after the incoming cold water flows, this distortion disappears. Thus, the combination of mixing and shut-off functions at the input valve results in excessive water consumption. In addition, this combination of valve functions makes the mixer more difficult to use.

The fourth drawback is use orientation of the known design predominantly as a bath mixer with a shower.

As the fifth drawback, the absence of the shut-off device position indicator of the inlet valve head in known design is considered. As a result, by opening the water flow with the shut-off device of the outlet valve head, the user has no idea of the position in which the shut-off device of the inlet valve head was left, and therefore of the approximate flow temperature, which can lead to scalding with a stream of too hot water and unpleasant exhilaration by a flow of too cold water. This indicator has particular importance in the bath mixers with a shower.

A sixth drawback of the known design is that shutting off the water flow by the outlet valve head with a difference in the pressure of the cold and hot water streams can lead to a flow of cold and hot water. Therefore, after using the mixer, it is recommended to shut off the water flow by means of the inlet valve head. However, this way of shutting the water flow off deprives the mixer of the ability to reuse the selected water temperature.

The proposed design is a mixer comprising
an inlet valve head body, having cold and hot water supply pipes and a valve in the form of two discs contacting each other, one of the discs is a stationary disc with two identical inlets, and the other is a movable disc with a passage, which is sequentially aligning with the inlets of the stationary disc;
an outlet head body, having a shut-off device in the form of two discs contacting each other; a shut-off device outlet connected to a spout;
a channel, connecting an outlet of the inlet valve head body with an inlet of the outlet head body,
wherein two inlets of the stationary disc of the inlet valve head are made in the form of a figure formed by joining ends of two arcs of different radius circles, or in the form of a circle sector, symmetrically about a line passing through the disc center, each of the inlets occupies an angle from 91 to 180° relative to the center, offset from the disc center on a line perpendicular to the symmetry line and passing through the disc center, to the value of more than 0.05 of the disc radius, the movable disc has a passage analogous to the openings of the stationary disc, and water flow temperature is adjusted within a rotation range of the handle, rod and movable disc of the inlet valve head of up to 180°, and the shut-off device of the outlet valve head has a stationary disc with one inlet analogous to the inlet of the movable disc of the inlet valve head; and a movable disc with the analogous inlet, and adjustment of water pressure is carried within a rotation range of the handle, rod and movable disc of the outlet valve head of up to 180°.

As follows from the description, the shape of the openings may be different, but they must occupy an angle of up to 180° relative to the center displaced from the disc center by more than 0.05 of the disc radius. The execution of the openings in form of a figure formed by joining the ends of two arcs of different radius circles results in a more smooth and uniform adjustment of the water temperature and pressure compared to these openings execution in the form of a circle sector and is more preferable. The joining of the ends of two arcs of different radius circles can be done with straight lines, straight lines with roundings at the ends, using semicircles with a radius equal to half the distance between the connected ends of the arcs, or by any other method.

The center displacement of the openings angle measurement from the disc center by more than 0.05 of the disc radius leads to the fact that the jumper between the openings will be more than 0.1 of the disc radius, which is sufficient for its strength and to create an overlap between the movable and stationary discs in the shut-off position. The movable disc of the inlet valve head in one of the extreme positions must reliably shut-off the hot water, in the other—cold water. The movable disc of the outlet valve head must reliably shut-off the mixed water. Therefore, the recommended value of the center displacement of the openings angle measurement from the disc center is greater than the minimum and is 0.1 of the disc radius.

The arcs centers of larger and smaller circles with radii $R_2$ and $R_3$, as shown in FIGS. 3 and 4, coincide with the disc center, but the arcs formed are truncated by a line parallel to the symmetry line and spaced from it by more than 0.05 of the disc radius. At the intersection of this line with a line perpendicular to the symmetry line and passing through the disc center, a point is formed that serves as a center for measuring the opening angle.

The formed openings can occupy an angle of less than 180°. In particular, FIGS. 3 and 4 show strokes of openings occupying an angle of 160° and 120° relative to the centers $O_2$ and $O_3$. In this case, the angle occupied by the openings will be equal to the angle within which the water temperature and pressure will be adjusted. Thus, with dashed openings shown in FIGS. 3 and 4, the adjustment of the water temperature, as well as the water pressure adjustment, will be carried out within the limits of rotation of the handle, rod and movable disc to 160° and 120°, respectively. Reducing the adjustment angle of the water temperature and pressure will somewhat reduce the technical results achieved.

First, cold and hot water flows through the respective supply pipes and supply channels to the two separate inlets of the first valve and mixed in the first valve chamber, and then the mixed water passes through the connecting channel of the valves to the second, shut-off valve, the outlet of which is connected to the spout.

Separate adjustment of the water temperature and pressure allows using the selected temperature repeatedly, which saves time in selecting the required water temperature, eliminates excessive consumption of water at the selection of its temperature and allows shut-off and re-opening water with the temperature already selected, even with a small gap between its productive consumption. Shutting the water flow off at small intervals between its productive consumption saves from 15 to 40% of the total water consumption. There is the possibility of reducing the water pressure after selecting its temperature, further increasing the efficiency of the mixer by 10-25%.

The water flow temperature in the mixer is adjusted intuitively from the previous position of the mixing valve. Turning the handle of the mixing valve upwards increases the temperature of the water flow, downwards—reduces. The maximum turn of the mixing valve handle downwards corresponds to the cold water flow; the maximum turn upwards corresponds to the hot water flow.

The proposed mixer design allows adjusting the water flow temperature within the limits of the turn by 180°, which reduces the step of adjusting the water temperature to two times and leads to a more accurate selection of this important parameter for the mixer. A more accurate temperature selection, in turn, helps to reduce the time of temperature selection and reduces the possibility of choosing a higher water temperature than necessary for the consumer. In addition, the hydraulic shocks created by the mixers are weakened when adjusting the ratio of cold and hot water flows, which increases the leaktightness of both the inlet and outlet valves and extends the service life of the valves.

In the proposed design, there is a clear delineation of functions between the valves. The inlet valve head performs only the function of mixing the flows of cold and hot water, and the outlet one—only a function of shutting the already mixed water off. Thus, the inlet valve is mixing, and the outlet valve is shutting off. A clear delineation of functions between the valves makes the proposed mixer more simple and intuitive to use, and also increases the economy of the mixer.

Due to the fact that shutting and opening of water when reusing the selected temperature is more often than adjusting the water temperature, the shut-off valve is recommended to be installed on the right, and the mixing one—on the left.

The proposed design of the mixer assumes the obligatory presence of the valve position indicator of the inlet valve head. For this purpose, the lower part of the mixer handles has the shape of a cylinder, the diameter of which coincides with the cylindrical projections of the mixer body, inside which the valves are located. As a result, a cylindrical transition of one diameter between the mixer body and the handles is formed, on which the valve position indicator is located, consisting of the actual indicator located on the stationary cylindrical part of the mixer body and the marked zones and divisions showing the position of the valve located on the lower cylindrical part of the movable handles. The actual indicator can be located on the front or top of the cylindrical projection of the mixer body or in any position between them.

The mixer has a zone color marking of the valve position indicator of the inlet valve head, which can have three, five or more zones. In the three-zone color marking of the position indicator marks of the mixing valve, the marks of the blue color are used in the region of the lowest temperatures, in the central position—the neutral-color marks (for example, yellow), in the region of the highest temperatures—the red color marks. In the five-zone color marking, the marks in the region of the lowest temperatures are blue, then the cyan marks, in the region of the central position of the valve—the neutral-color marks (for example, yellow), then marks of pink color, at the highest temperatures—the red color marks. Advantages of the five-zone mixing valve position indicator are in more precise indication of the water temperature range. Thus, before the opening of the shut-off valve, the user will have an idea of the position of the mixing valve and therefore of the approximate temperature of the water flow, which will prevent such negative possibilities as scalding by the flow of too hot water and unpleasant exhilaration by the flow of too cold water.

In this case, it becomes possible to set the required position of the mixing valve before the opening of the shut-off valve and thus select the approximate required water flow temperature. Moreover, this choice is made intuitively on the basis of the perception of the color marking zones and their marks. The presence of color marking zones on the handle of the mixing valve distinguishes it from the shut-off valve and avoids the confusion of the valves and their functions.

The valve position indicator of the inlet valve head can be located not only at the joint of the lower part of the handles and the mixer body, but also on the handle cover. For this end, the handle cover has a transparent insert in the form of a figure formed by joining the ends of two arcs of circles of different radii, occupying an angle of up to 180°, above which are the marks of the indicator, having a color marking, and the base for the inlet valve head has a corresponding projection located in the zone of transparent insert, which is actually an indicator. In order for the handle to be mounted on the rod in the desired position and the indicator to be work correctly, the rod head should have a corresponding protrusion that fixes the handle to the rod in the given position.

For a better overview of the valve position indicator of the inlet valve head, it can be located not only symmetrically with the outlet valve head, as shown in FIG. 1, but also in upright position. In this case, the handle of the inlet valve head will be located above the mixer body, and the beginning of the spout will shift to the front of the body. Since the handle of the input valve head will not be protruded forward, the spout can be of standard height in this design.

The mixer can also have a position indicator of the outlet valve head shut-off device, dividing the marks into zones by means of special signs in the form of small circles or circles of different diameters. Division of marks can be carried out on three, five or more zones. In the case of a three-zone division of the marks, a circle of small diameter indicates the first zone having the lowest water pressure, the circle of the mean diameter is the second zone corresponding to the mid-position of the valve, the large diameter circle is the third zone having the greatest water pressure. In the five-zone division of marks, the circle with the smallest diameter denotes the first zone with the lowest water pressure, the second diameter circle is the second zone with the water pressure less than the average, the third one is the third zone corresponding to the mid-position of the mixing valve, the fourth one is the fourth zone with the water pressure is higher than the average, the fifth one is the fifth zone with the maximum water pressure. The advantage of the five-zone division of marks is in more accurate indication of the water pressure range. To denote marks and dividing them into sign zones, a second neutral color (for example, brown) is used. The presence of such indicator, firstly, gives the user an idea of the position of the shut-off valve and, consequently, of the approximate water flow, and secondly, after adjusting the water temperature at an average pressure, reduce the pressure to any desired level in order to save water. Reduction of the water pressure, carried out with an orientation to the pressure zones and their marks, carried out after selecting its temperature, can significantly reduce the water flow rate.

In order to eliminate the possibility of flow of cold and hot water with shutting the mixed water off by means of the outlet valve, the proposed design assumes the presence of check valves that are installed on the supply channels of cold and hot water inside the mixer body. Check valves are not shown in the drawings. To reduce the number of joints that reduce the overall leaktightness of the mixer, the supply channels for cold and hot water can have built-in check valves.

Thus, the proposed design eliminates all the shortcomings of the closest analogue and creates the following technical results:

1) decreasing the step of adjusting the water temperature and increasing the accuracy of the selection of this parameter;

2) reduction of the step of adjusting the water pressure and increasing the accuracy of its selection;

3) increase of the mixer economy;

4) reduction of the hydraulic shocks force created by the mixer, increase of the valves leaktightness and increase in the service life of the mixer;

5) great simplicity and intuitive understandability in using the mixer;

6) prevention of such negative opportunities as scalding by the flow of too hot water and unpleasant exhilaration by the flow of too cold water;

7) elimination of the possibility of the cold and hot water flow.

To ensure that the temperature of the water flow is not changed as a result of the use of the water supply system by other water users, the proposed design assumes the availability of standard water pressure regulators. The maintenance of water pressure at their outlets at the same level contributes to a more accurate preservation of the water temperature selection result.

The proposed mixer can also have a known pressure equalizer for cold and hot water, which is installed in the lower part of the mixer body before the inlet valve. Automatic equalization of the cold and hot water flows pressure contributes to a more accurate preservation of the water temperature selection result. However, in the presence of widely distributed standard water pressure regulators in such alignment, there is no particular need.

FIG. 1 shows a front section of the design of a two-valve mixer with separate control of water temperature and pressure.

In FIG. 2 is shown a vertical section through the line 2-2 in FIG. 1.

FIGS. 1 and 2 show: cold water supply pipe 1; hot water supply pipe 2; cold water supply channel 3; hot water supply channel 4; body of the inlet valve head 5; base for the installation of the inlet valve head 6; O-ring of the valve head body 7; valve rod 8; rod head with grooved surface 9; eccentric ring 10; O-rings of rod 11; anti-friction pad 12; rod clevis (carrier, pan-tilt) 13; part of the rod clevis, limiting the rotation, 14; restrictive protrusion of the inner surface of the valve head body 15; movable ceramic disc of the inlet valve head with a passage 16; stationary ceramic disc of the inlet valve head 17; the inlet of a stationary ceramic disc for cold water 18; the inlet of a stationary ceramic disc for hot water 19; rubber cylindrical gasket of the inlet valve head with inlets for cold and hot water 20; partition in the base for the installation of the inlet valve head separating the cold and hot water supply 21; inlet valve head chamber 22; the outlet of the inlet valve head body 23; faces of the valve head body under the spanner 24; cuff of the valve head 25; connecting channel of the valves 26; the outlet valve head body 27; base for mounting the outlet valve head 28; movable ceramic disc of the outlet valve head with a passage 29; stationary ceramic disc of the outlet valve head with inlet 30; rubber cylindrical gasket of the outlet valve head 31; inlet for mixed water of outlet valve head rubber cylindrical gasket 32; inlet for mixed water in the base for mounting the outlet valve head 33; outlet of the outlet valve head 34; outlet channel of the outlet valve 35; channel for connecting the outlet channel of the outlet valve and the spout 36; handle 37; connection of handle and rod 38; small anti-friction ring 39; large anti-friction ring 40; hole with internal thread for screw fastening the handle 41; screw fastening the handle 42; handle cover 43; mixer body 44; upper removable cover of the mixer body 45; base of the mixer body 46; spout 47; union nut for fixing the spout 48.

Figure 1:
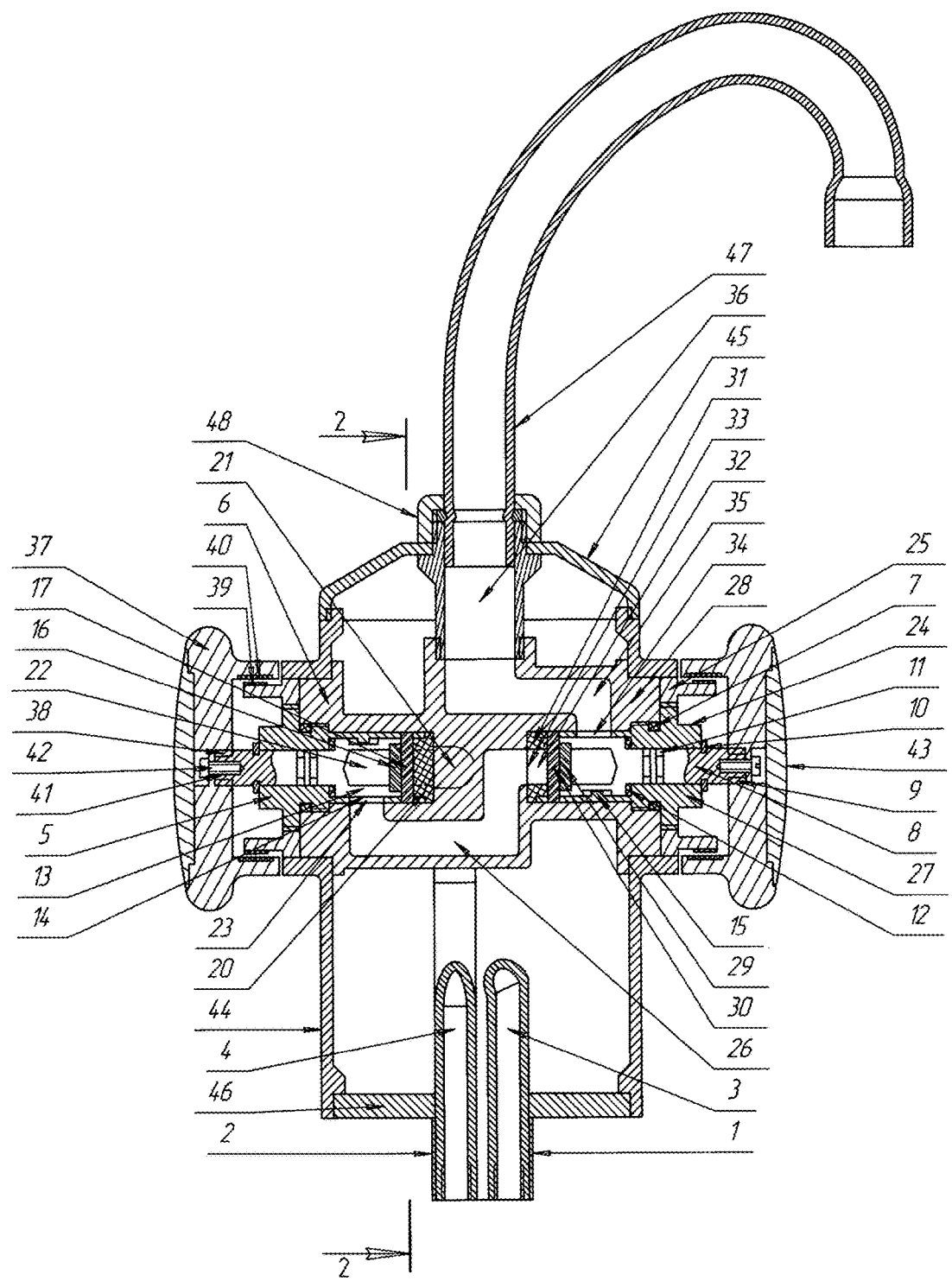
Figure 2:
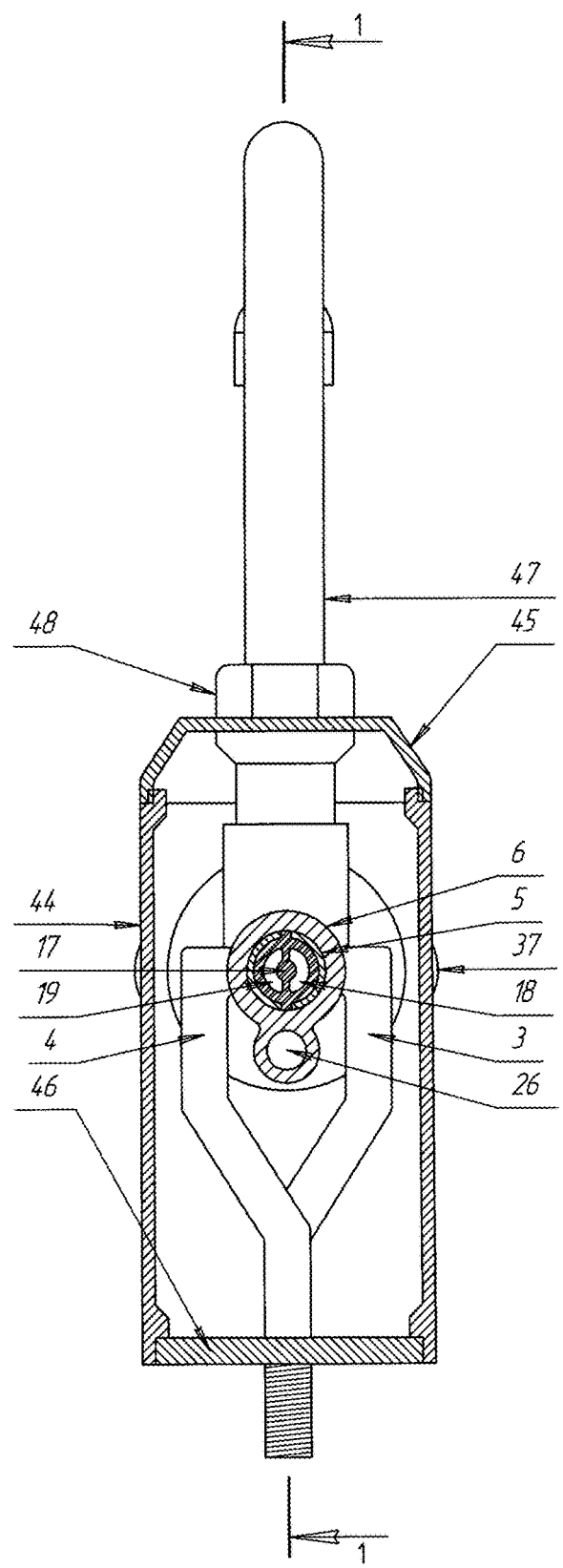
Figure 3:
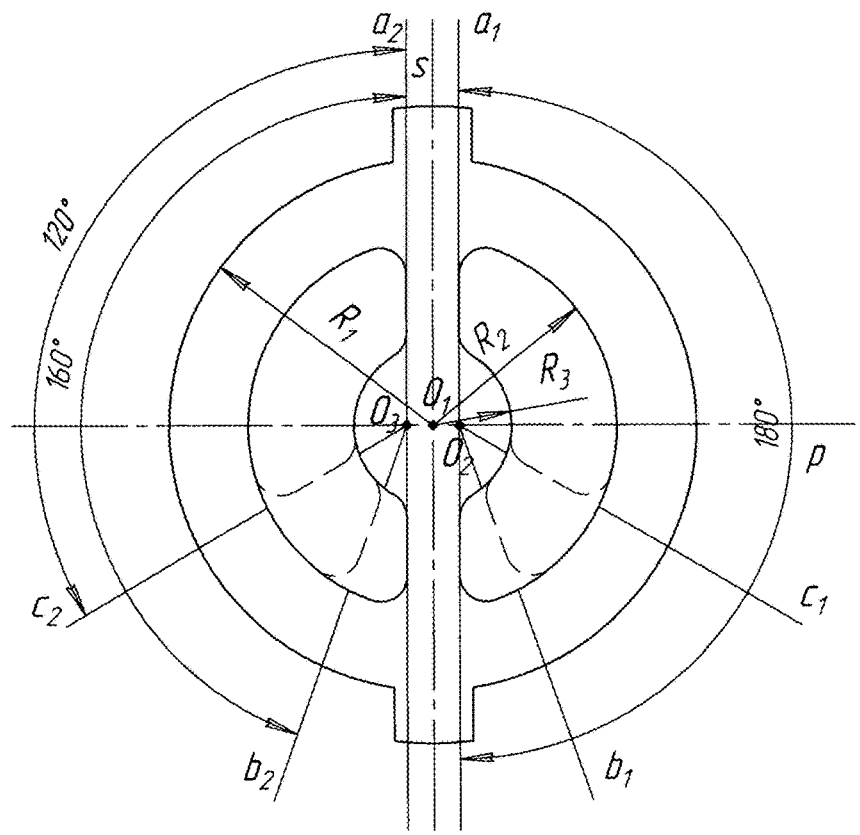
FIG. 3 shows a stationary ceramic disc of the inlet valve head with inlets for cold and hot water.
Figure 4:
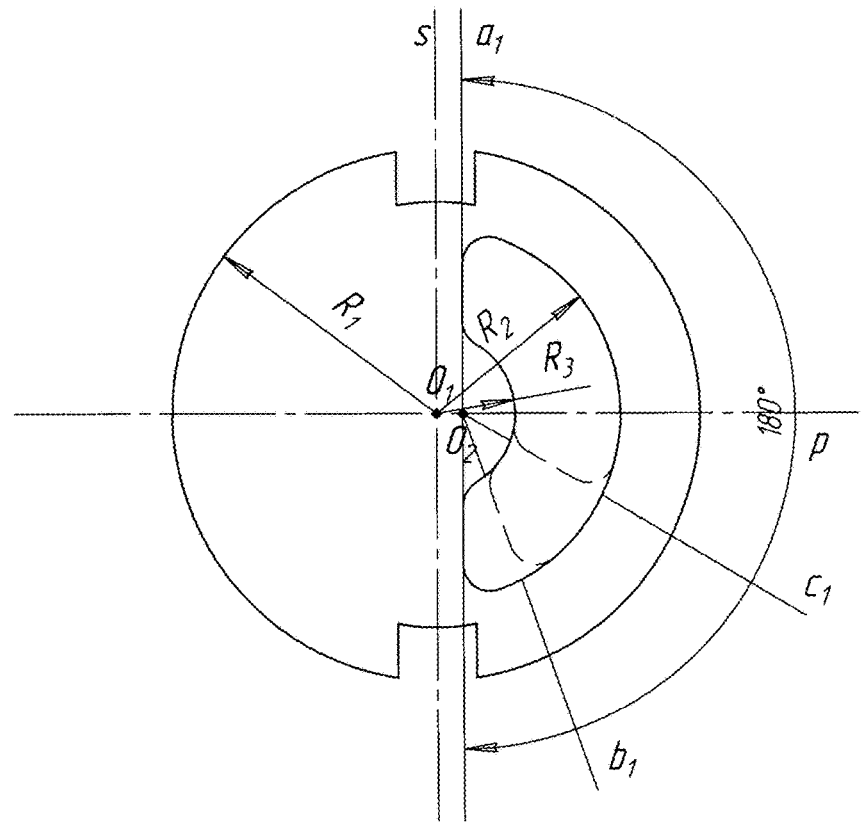
FIG. 4 depicts a movable ceramic disc of the inlet valve head with a passage.

Stationary and movable discs of the inlet valve head in FIGS. 3 and 4 are enlarged.

In FIGS. 3 and 4 the following is shown: $O_1$—the disc center; s—the symmetry line of the openings passing through the disc center; p—a line perpendicular to the symmetry line and passing through the disc center; $a_1$ and $a_2$—lines parallel to the symmetry lines and spaced from it by more than 0.05 of the disc radius; $O_2$ and $O_3$—points serving as the centers for measuring the angles occupied by the openings; $b_1$ and $b_2$—rays which together with the corresponding rays of the lines $a_1$ and $a_2$, form angles of 160°; $c_1$ and $c_2$—rays that, together with the corresponding rays of the lines $a_1$ and $a_2$, form angles of 120°; $R_1$—radius of the disc; $R_2$— radius of the circumference of the opening outer arc; $R_3$— radius of the circle of the opening inner arc. The dashes in FIGS. 3 and 4 show openings occupying angles 160° and 120°, respectively, relative to the centers $O_2$ and $O_3$.

Figure 5:
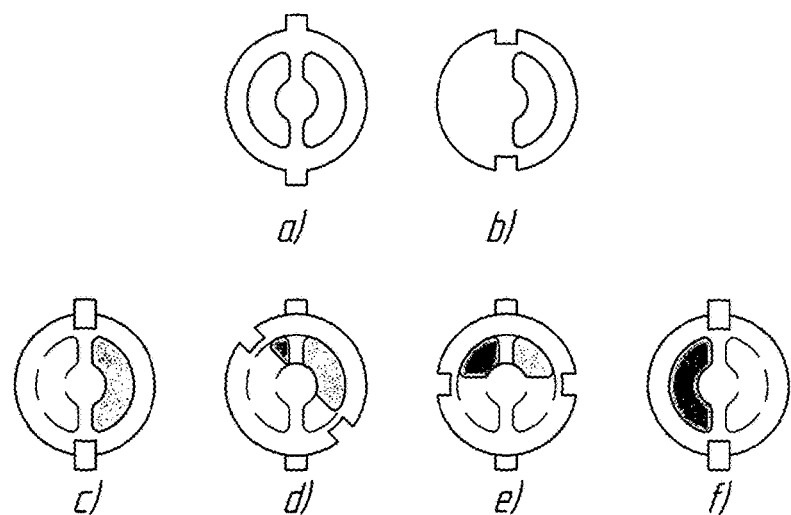

FIG. 5 shows the interaction of the movable and stationary discs of the inlet valve head: a) stationary ceramic disc of the inlet valve head; b) movable ceramic disc of the inlet valve head; c) position 1—initial position; d) position 2—rotation by 45°; e) position 3—rotation by 90°; f) position 4—rotation by 180°.

Figure 6:
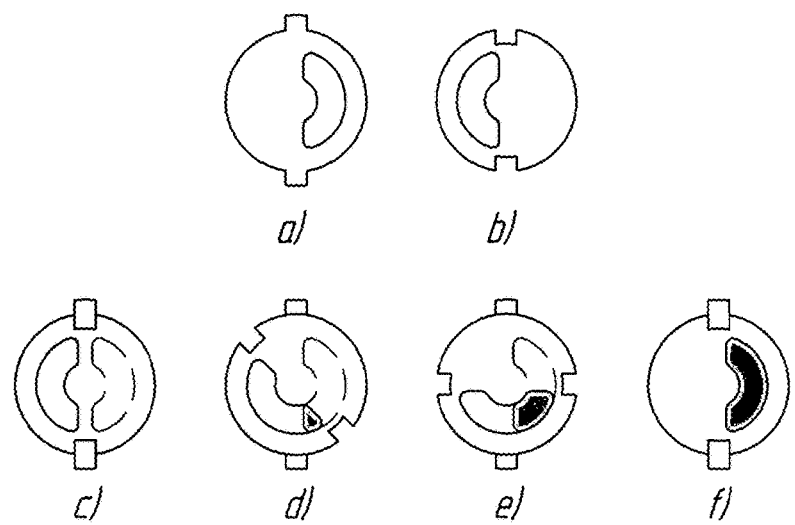
Figure 6:
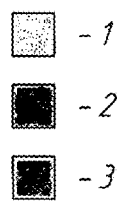

FIG. 6 shows the interaction of the mobile and stationary discs of the outlet valve head: a) stationary ceramic disc of the outlet valve head; b) movable ceramic disc of the outlet valve head; c) position 1—initial position; d) position 2—rotation by 45°; e) position 3—rotation by 90°; f) position 4—rotation by 180°.

Closed by movable ceramic disc openings of the stationary ceramic disc are shown in dashes in FIG. 5-6.

Shading 1 in FIG. 5-6 shows cold water, shading 2—hot water, shading 3—mixed water.

The term "ceramic" is quite conventional and is understood in the broadest sense, including cermet.

The mixer due to the presence of supply channels of cold and hot water located inside its body has a standard water supply and a standard installation, which is much simpler than in the closest analogue.

The base for the inlet valve head installation, the connecting channel of the valves, the base for the outlet valve head, the outlet channel of the outlet valve and the channel for connecting the outlet channel of the outlet valve and the spout can be made as a single part.

The installation of the inlet valve head in the base in a traditional way by screwing in requires special precision, since the displacement of the inlet openings of the stationary disc relative to the inlet openings of the rubber gasket or openings in the base for mounting the valve head can lead to malfunction of the mixing valve. For the exact installation of the inlet valve head in the correct position, it is suggested to install it using a union nut. In this case, at the base of the inlet valve head, there is a pin-shaped protrusion that passes through the entire rubber pad, fixing it in the correct position relative to the inlet openings of the stationary ceramic disc, and creates at the end of the valve head a protrusion for fixing it at the base for mounting the inlet valve head, which has a groove corresponding to this protrusion. Thus, the inlet valve head with a properly installed and fixed rubber gasket is inserted into the base hole for mounting the valve head to the stop. Then it turns so that the pin-shaped protrusion falls into the corresponding recess, fixing the inlet valve head in the correct position. After that, the union nut is put on the protruding part of the valve head, which is screwed on the cylindrical protrusion of the base for mounting the valve head, pressing firmly as a rubber cylindrical gasket located between the stationary disc and the base for mounting the valve head, and the rubber sealing ring located between a protrusion of the valve head body and a cylindrical protrusion of the base for its installation. It is also possible to install the inlet valve head in the base with the help of fastening screws.

It is possible to use the proposed design and as a mixer for a bath with a shower. An important feature of the mixer for a bath with a shower is that the valves are located at a greater distance from each other and there is a bath-shower switch between them. Therefore, in the design version for a bath with a shower, an elongated cold water supply channel runs along the rear wall of the mixer body to the cold water inlet of the inlet valve head installed to the left. The inlet for the hot water of the inlet valve head has a shorter hot water supply channel. The outlet of the inlet valve head is connected to the inlet of the outlet valve head on the right by means of an elongated connecting channel of the valves. The connecting channel of the valves goes a short distance from the cold water supply channel and can be located above it for greater compactness. The outlet of the outlet valve head is connected to the bath-shower switch with the help of a special connecting channel, depending on the position of which the water is directed to the spout or into the cone for shower hose connection when opening. In this design version, the mixer body is somewhat larger than the standard dimensions.

Unlike the known thermostatic mixers, the proposed design does not have a complicated thermostatic valve, which makes it simpler and cheaper to manufacture. In this case, in the presence of standard water pressure regulators, the result of adjusting the water temperature is quite comparable with the corresponding parameter of thermostatic mixers. The greater simplicity and lower cost of production of the proposed design will lead to greater availability of it for consumers, which in turn will lead to greater total water savings. In addition, the large simplicity of the construction makes it more reliable, facilitates its maintenance and repair, and contributes to an increase in the mixer service life.

Advantages of the proposed design in comparison with traditional two-valve mixers are not only in saving water in selecting the temperature, but also in the possibility of rapid shutting off and opening the water of the selected temperature at small intervals between its productive consumption and the possibility of reducing the water pressure after selecting its temperature. Using these features will allow the user to significantly reduce water consumption.

The invention claimed is:

1. A mixer comprising
   an inlet valve head body, having cold and hot water supply pipes and a valve in the form of two discs contacting each other, one of the discs is a stationary disc with two identical inlets, and the other is a movable disc with a passage that is sequentially aligning with the inlets of the stationary disc;
   an outlet head body having a shut-off device in the form of two discs contacting each other; a shut-off device outlet connected to a spout;
   a channel connecting an outlet of the inlet valve head body with an inlet of the outlet head body,
   wherein the two inlets of the stationary disc of the inlet valve head body are made in the form of a figure formed by joining ends of two arcs of different radius circles, or in the form of a circle sector, symmetrically about a line passing through a disc center, each of the inlets occupies an angle from 91 to 180° relative to the center, offset from the disc center on a line perpendicular to the symmetry line and passing through the disc center, to the value of more than 0.05 of the disc radius, the passage of the movable disc is analogous to openings of the inlets of the stationary disc, and water flow temperature is adjusted within a rotation range of a handle, a rod, and the movable disc of the inlet valve head body of up to 180°, and the two discs of the shut-off device of the outlet valve head body have a stationary disc with one inlet analogous to the inlet of the movable disc of the inlet valve head body and a movable disc with a passage analogous to the inlet of the stationary disc of the shut-off device, and adjustment of water pressure is carried within a rotation range of a handle, a rod, and the movable disc of the shut-off device of up to 180°.

* * * * *